Patented Nov. 6, 1923.

1,473,350

UNITED STATES PATENT OFFICE.

VICTOR LENHER, OF MADISON, WISCONSIN.

METHOD OF EFFECTING SOLUTION OF SUBSTANCES AND REMOVING COATINGS FROM BODIES.

No drawing. Original application filed January 7, 1921, Serial No. 435,730. Divided and this application filed November 28, 1921. Serial No. 518,439.

*To all whom it may concern:*

Be it known that I, VICTOR LENHER, a citizen of the United States, residing at 158 Summit Avenue, Madison, in the county of Dane and State of Wisconsin, have invented a new and useful Improvement in Methods of Effecting Solution of Substances and Removing Coatings from Bodies, of which the following is a specification.

The present invention relates particularly to a method of effecting solution of nonmetallic substances or compounds which are either insoluble in or highly resistant to the action of the solvents which are commercially known. The invention is based upon the discovery by me that selenium oxychloride ($SeOCl_2$), either alone or compounded with other substance or substances, will readily dissolve many substances.

The present application constitutes a division of application Serial No. 435,730, filed January 7, 1921, which is itself a division of application No. 401,218, filed August 4, 1920. The present divisional application relates more particularly to the action of a solvent comprising selenium oxychloride on substances containing hydrocarbons, or compounds of carbon and hydrogen.

I have discovered a practicable process of producing selenium oxychloride on a commercial scale, and having produced the compound in considerable quantities, I have demonstrated that it possesses such remarkable properties as a solvent that it may be put to many useful applications. It may be used as a solvent for numerous substances or compounds for which no known solvent exists, and it may be mixed or compounded with other active compounds having the effect of increasing its range as a solvent, thus rendering it possible to dissolve readily substances or compounds which selenium oxychloride alone will not dissolve or will dissolve only with difficulty. Uses for the new compound too numerous to mention are contemplated by me. Novel methods of producing or recovering certain substances, involving the use of selenium oxychloride or compounds thereof are contemplated by me. Various uses may be made of the compound some of which will be hereafter suggested.

The production of a novel compound which will act as a solvent for certain substances or compounds for which the selenium oxychloride itself will not serve has been mentioned. As an illustration, $SeOCl_2$ may be used to dissolve such active compounds as sulphur trioxide ($SO_3$) thus producing a new compound which will serve as a solvent for other substances not attacked by known solvents and not attacked by $SeOCl_2$ itself. Again, such compounding produces a more active solvent for some purposes, i. e., a solvent which will act more quickly than selenium oxychloride alone. The proportions may vary within quite wide range. As an example, an excellent solvent is produced by dissolving 10 parts by weight of $SO_3$ in 90 parts by weight of $SeOCl_2$. This produces a compound which will act as a solvent for various materials, including certain oxides, for example, titanium oxide ($TiO_2$), vanadium oxide ($V_2O_3$) and columbium pentoxide ($Cb_2O_5$). This indicates the separation of metals from ores by new processes.

It may be necessary or desirable to moderate the solvent action of selenium oxychloride for certain purposes. This may be done, for example, by mixing with a quantity of the oxychloride a quantity of some substance which is not an active substance, or which is less active and which will thus act as a diluent. For example, one may mix 25 pounds of selenium oxychloride with 75 pounds of carbon tetrachloride, thus producing a mild form of solvent which may be employed, in general, where a mild solution is desired as a solvent or reagent. The mixture of selenium oxychloride with such a substance may be made of any desired proportions, according to the use or purpose intended.

In general, the non-metals are attacked or dissolved by selenium oxychloride and by selenium oxychloride compounded with an active substance which will enhance the solvent action or increase the range of solvent action of selenium oxychloride. Among the substances which may be thus dissolved there may be given as examples selenium, sulphur, iodine, tellurium and phosphorus. In a number of these reactions, novel compounds are produced. Certain of the non-metal, such as silicon and boron, are not attacked by selenium oxychloride.

I have discovered also that selenium oxychloride is a solvent for a number of hydrocarbons, while it is not a solvent for others. This enables some very important separations and purifications to be effected by the use of this material as a solvent. Selenium oxychloride reacts with unsaturated hydrocarbons such as acetylene, amylene, turpentine, mesitylene, cymene, pseudo cumene, anthracene, napthalene and diphenylmethyl, and with these unsaturated compounds forms derivatives. With the saturated hydrocarbons of the aliphatic series it does not unite. For example, the pure hydrocarbons, pentane, hexane, heptane, decane, are insoluble and immiscible in this solvent. Certain other hydrocarbons such as toluol and benzol dissolve readily in selenium oxychloride. By means of the use of selenium oxychloride certain hydrocarbons can be extracted from various substances, thus enabling separations and purifications to be effected. As an example I may mention the extraction of impurities including hydrocarbons from charcoal or other forms of carbonized substances in accordance with the method set forth in application Serial No. 411,258, filed in the United States Patent Office September 18, 1920.

In the case of purification of charcoal, for example, the carbon is activated, thus making it a valuable absorbent for gases and liquids.

The solvent may be used, also, for removing carbonaceous material from the cylinders of internal combustion engines. Such deposit usually consists largely of particles of carbon, more or less cemented together with hydrocarbons, such as partially carbonized oils or deposits from oils, including gasoline, etc.; and $SeOCl_2$ alone, or compounded with $SO_3$, for example, will sufficiently dissolve the binder constituents of the carbonized mass to cause the disintegration thereof and the cleansing of the cylinders. Suitable precautions may be taken to prevent injury to the metal. For example, the selenium oxychloride may be diluted with carbon tetrachloride; or, if the solvent be used in undiluted condition, care may be exercised to prevent it from remaining too long in contact with the metal.

A suitable method for removing carbonaceous material from the cylinders of an internal combustion engine is to introduce the solvent comprising selenium oxychloride into the cylinders of the engine in any suitable manner, as for example, by pouring the solvent into the priming cups, and then turning the motor, without firing the engine. The motor may be turned over by the starter, or by hand, after a few minutes operation in this manner, the engine may be operated under its own power to dry out the cylinders.

I have discovered further that selenium oxychloride is a solvent for rubber, both the pure rubber and the vulcanized rubber. It is a solvent for phenolic condensation products, including both the fusible and infusible products. Such products, in their final state, have long been regarded as insoluble. I have discovered that the so-called insoluble condensation products are soluble in selenium oxychloride and in selenium oxychloride compounded with sulphur trioxide. This includes products known on the market as redmanol, bakelite, condensite, etc. The substances are also a solvent for resinous materials or binders in general, including the natural resins, glues (including casein glues), gelatin, celluloid, varnish, lacquer and paints. Selenium oxychloride and the compound of selenium oxychloride mentioned may be employed practically as paint, varnish and enamel removers.

I have discovered further that selenium oxychloride attacks and dissolves proteins, including wool, silk, hair, bristles, leather, etc., but reacts in the absence of water very poorly or not at all on starch and cellulose, including wood and wood pulp. This enables certain separations and purifications to be effected in connection with this class of materials.

Selenium oxychloride alone or compounded with a modifying agent will react with vegetable, animal and fish oils, and certain greases. Thus, the solvent may be used for removing coatings of grease, oils, or the like, from articles or bodies, or for "cutting" oils or greases, where desired for any purpose. Selenium oxychloride is itself soluble in carbon tetrachloride ($CCl_4$) and in chloroform ($CHCl_3$). While the power and range of action of selenium oxychloride may be enhanced or enlarged by the addition of such a compound as sulphur trioxide, the action of the material as a solvent may also be lessened or retarded by the employment of a suitable diluent, such as carbon tetrachloride, or chloroform, used in suitable proportion.

In connection with the discovery that selenium oxychloride, alone or compounded with a modifying agent is a solvent for numerous hydrocarbons, while it is not a solvent for other hydrocarbons, it may be stated that this peculiarity or property renders it possible to separate, for example, unsaturated from saturated hydrocarbons. For example, amylene ($C_5H_{10}$) may be separated from heptane ($C_7H_{16}$) and heptane may be separated from benzol ($C_6H_6$). Thus a mixture of amylene and heptane may be introduced into selenium oxychloride. This will dissolve the amylene, and the heptane will appear as an insoluble supernatant liquid, which may be decanted. The amylene will unite chemically with the oxychloride. In the case of benzol and heptane, the benzol is simply dissolved and may be recovered by fractional distillation.

Because of the powerful solvent qualities of selenium oxychloride and the still more powerful solvent qualities of selenium oxychloride compounded with sulphur trioxide, it is desirable that operations with these materials be practiced in vessels composed of, or lined with, such materials as will not be attacked by the solvent. For example, glass or terra cotta vessels, or vessels lined with these materials may be employed. In cases where the solvent is employed for removing varnish from metal, suitable precautions should be taken to remove the metal from the solvent before the metal is substantially attacked by the solvent. In the case of the removal of a coating from wood, less care is necessary, because the solvent will not readily attack cellulose.

$SeOCl_2$ may be obtained in accordance with the process described in my application No. 381,628, filed in the United States Patent Office May 15, 1920.

From the foregoing description, it will be evident that I have discovered many useful applications of selenium oxychloride and selenium oxychloride compounded with a modifying agent. The detailed description has been given for clearness of understanding only, and no unnecessary limitations should be understood therefrom, but the appended claims should be construed as broadly as permissible, in view of the premises.

What I regard as new, and desire to secure by Letters Patent, is—

1. The method of effecting the separation of saturated and unsaturated hydrocarbons from each other, which comprises subjecting the same to the action of a solvent comprising selenium oxychloride.

2. The method of effecting separation of saturated and unsaturated hydrocarbons from each other which comprises subjecting the same to the action of a solvent comprising selenium oxychloride, and then separating the solution from the insoluble substances.

3. The method of removing from the cylinders of internal combustion engines, carbonaceous deposits containing hydrocarbons which comprises subjecting such deposits to the action of a solvent comprising selenium oxychloride.

4. The method of removing from an object grease containing hydrocarbons soluble in selenium oxychloride, which comprises treating the same with a solvent comprising selenium oxychloride.

5. The method of treating a body comprising a substance insoluble in selenium oxychloride and a hydrocarbon soluble in selenium oxychloride, which comprises subjecting such body to the action of a solvent comprising selenium oxychloride, and separating the resulting solution from the insoluble substance.

VICTOR LENHER.